United States Patent
Xie et al.

(10) Patent No.: US 11,235,502 B2
(45) Date of Patent: Feb. 1, 2022

(54) MOLD CARRIER FOR INJECTION MOLDING

(71) Applicant: International Business Machines Corporation, Armonk, NY (US)

(72) Inventors: Pengcheng Xie, Shenzhen (CN); Rui Ma, Shenzhen (CN); Qiuyi Yu, Shenzhen (CN); XiYuan Yin, Guangzhou (CN); Qiuying Wang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 16/416,852

(22) Filed: May 20, 2019

(65) Prior Publication Data
US 2020/0368954 A1    Nov. 26, 2020

(51) Int. Cl.
*B29C 45/78* (2006.01)
*B29C 45/17* (2006.01)
*B29C 45/04* (2006.01)

(52) U.S. Cl.
CPC .......... *B29C 45/78* (2013.01); *B29C 45/0441* (2013.01); *B29C 45/1744* (2013.01); *B29C 2945/7604* (2013.01); *B29C 2945/76254* (2013.01); *B29C 2945/76531* (2013.01); *B29C 2945/76732* (2013.01)

(58) Field of Classification Search
CPC . B29C 45/78; B29C 45/1744; B29C 45/0441; B29C 2945/76732; B29C 2945/76254; B29C 2945/76531; B29C 2945/7604
See application file for complete search history.

(56) References Cited

U.S. PATENT DOCUMENTS

| | | | | |
|---|---|---|---|---|
| 4,850,217 A | * | 7/1989 | Nunn | B29C 45/76 73/54.11 |
| 5,452,999 A | * | 9/1995 | Evans | B29C 45/73 165/263 |
| 5,855,935 A | * | 1/1999 | Brent | B29C 33/202 425/574 |

(Continued)

FOREIGN PATENT DOCUMENTS

CA    2427832 C    5/2002

OTHER PUBLICATIONS

Ivascu et al., "Dynamic Temperature Control in Injection Molding with New Conformal Heating/Cooling System," https://pdfs.semanticscholar.org/2c76/7293446b5b0f12b96b7cd41cb60a4324e465.pdf, The Annals "Dunărea De Jos" of Galaţi Fascicle V, Techolologies in Machine Building, ISSN 1221-4566 2010, pp. 5-11.

*Primary Examiner* — Galen H Hauth
(74) *Attorney, Agent, or Firm* — Robert J. Shatto

(57) ABSTRACT

Provided is a mold carrier. The mold carrier comprises a mold bearing chassis, a pressure bearing plate, and a tie bar. The mold bearing chassis includes a plurality of molds disposed therein. Each mold has one or more mold cavities. The pressure bearing plate is configured to physically couple to the mold bearing chassis during an injection molding process. The tie bar runs through the center of the mold bearing chassis and the pressure bearing plate. The mold bearing chassis is configured to allow components to be removed from their molds without separating the mold bearing chassis from the pressure bearing plate.

20 Claims, 7 Drawing Sheets

(56) References Cited

U.S. PATENT DOCUMENTS

| | | | |
|---|---|---|---|
| 7,159,834 B1 | 1/2007 | Abbas et al. | |
| 2005/0255184 A1* | 11/2005 | Maupin | B29C 45/06 |
| | | | 425/144 |
| 2010/0044900 A1* | 2/2010 | Shikase | B29C 45/78 |
| | | | 264/40.6 |
| 2015/0076735 A1* | 3/2015 | Moyer, II | B29C 45/06 |
| | | | 264/297.3 |
| 2016/0082636 A1 | 3/2016 | Altonen et al. | |
| 2017/0157824 A1* | 6/2017 | Ward | B29C 45/22 |
| 2019/0337210 A1* | 11/2019 | Hardie | B29C 45/1704 |

* cited by examiner

MOLD CARRIER FOR INJECTION MOLDING

BACKGROUND

The present disclosure relates generally to the field of injection molding, and more particularly to a rotatable mold carrier for controlling inner stresses in a component manufactured by injection molding.

Injection molding is a manufacturing process that is widely used to produce parts in the electronic industry. Injection molding involves injecting molten material into a mold. Injection molding can be performed with a host of materials including metals (for which the process is called die-casting), glasses, elastomers, confections, and many thermoplastic and thermosetting polymers. Material for the part is fed into a heated barrel, mixed, and injected into a mold cavity, where it cools and hardens to the configuration of the cavity.

SUMMARY

Embodiments of the present disclosure include a mold carrier. The mold carrier comprises a mold bearing chassis, a pressure bearing plate, and a tie bar. The mold bearing chassis includes a plurality of molds disposed therein. Each mold has one or more mold cavities. The pressure bearing plate is configured to physically couple to the mold bearing chassis during an injection molding process. The tie bar runs through the center of the mold bearing chassis and the pressure bearing plate. The mold bearing chassis is configured to allow components to be removed from their molds without separating the mold bearing chassis from the pressure bearing plate.

Further embodiments of the present disclosure include a method, computer program product, and system for controlling inner stresses of components manufactured using an injection molding process. The method includes injecting molten material into a first mold disposed on a mold carrier using an injection molding machine to create a component. The mold carrier includes a plurality of molds. The component in the first mold is then allowed to at least partially solidify. After the component has partially solidified, the mold carrier is rotated such that a second mold of the plurality of molds is aligned with a nozzle of the injection molding machine. A temperature of the first mold is then controlled according to a stress release profile.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
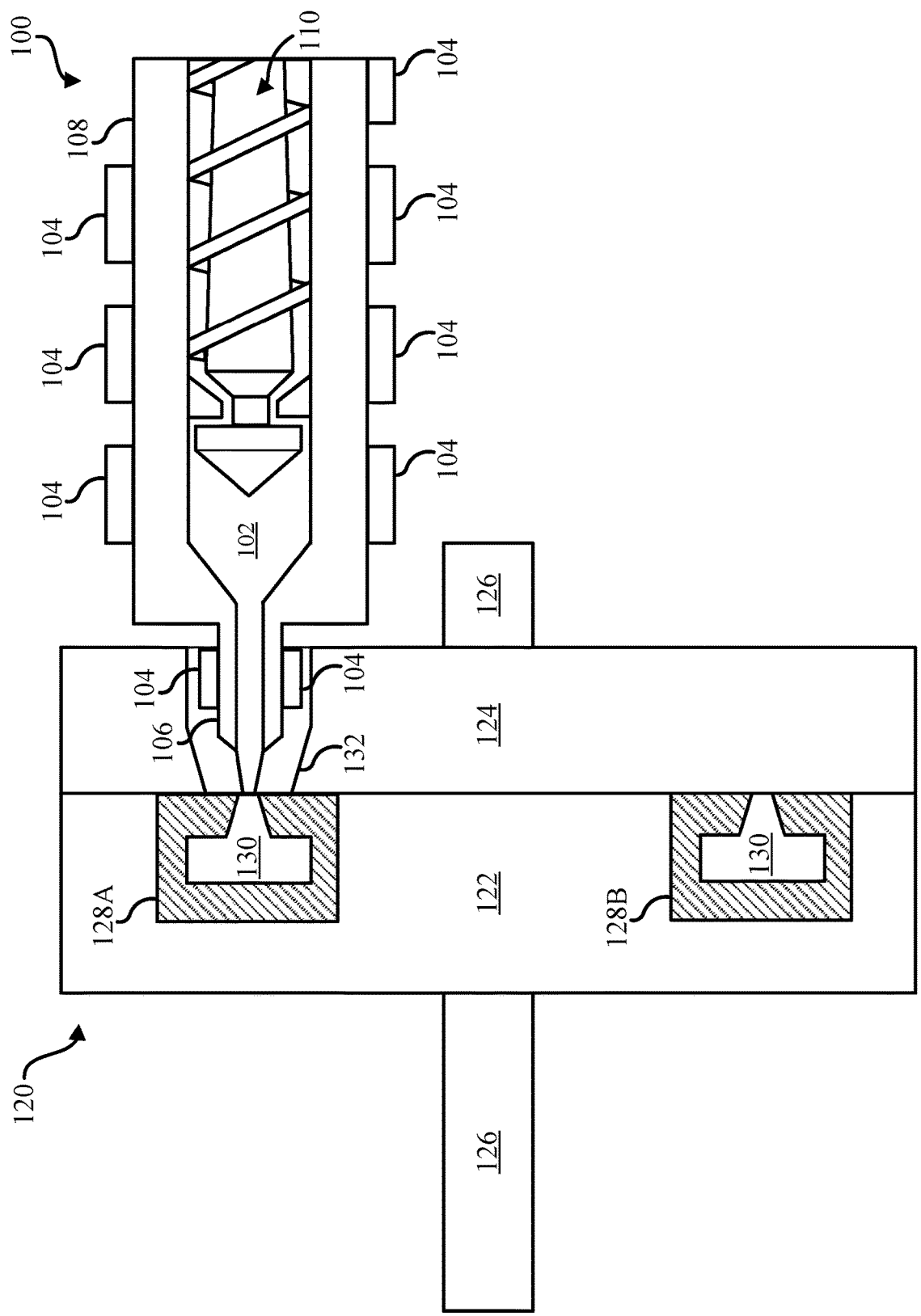
FIG. 1 illustrates a schematic of an injection molding machine injecting molten material into a rotatable mold carrier, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of injection molding, and in particular to a rotatable mold carrier for controlling inner stresses in a component manufactured by injection molding. While the present disclosure is not necessarily limited to such applications, various aspects of the disclosure may be appreciated through a discussion of various examples using this context.

Injection molding is a common manufacturing process used to create components in the electronics industry. For example, injection molding can be used to manufacture land grid array (LGA) sockets for integrated circuits. However, the injection molding process can introduce residual, inner stresses in the final component. These inner stresses may be caused by numerous factors, include component structure design, component size, metal insert, mold structure design, ejection mechanism, processing temperature, and pressure. The residual stresses may create various problems with the component, such as deformation that causes the critical to function (CTF) dimensions being out of tolerance. Furthermore, processes designed to release the inner stress, which often include subjecting the component to high temperature after ejecting it from the mold (e.g., solder reflow), can result in warpage.

One problem that causes inner stress is the unstable polymer conformation that was "frozen" when the molded part is cooling down in the mold. Due to the inevitability of heating and cooling processes, the stable/balanced polymer conformation at melting temperature needs to transform to another stable/balanced polymer conformation at room temperature in order to produce an ideal component (e.g., one with zero internal stresses). However, this process would take a very long cooling time and still leave residual inner stresses in practice.

Embodiments of the present disclosure address these and other problems by utilizing a mold carrier that includes multiple, movable molds. Each mold may be moved, in sequence, after the molten material has been injected into the mold. The molds may then go through a controlled temperature cycle (referred to herein as a stress release cycle) to release inner stresses in the components. For example, when one mold enters the stress release cycle after injection molding, the next mold starts the injection molding process (e.g., has molten material injected into the mold). Then, when that mold completes the injection molding process, it enters the stress release cycle. Once the component inside a particular mold has completed the stress release cycle, the component can be removed from the mold. This allows the component to undergo the stress release cycle while still constrained by the mold, thereby releasing the inner stresses without the component warping. Furthermore, because the mold carrier includes a plurality of molds, with some molds undergoing the stress release cycle (e.g., each at a different point in the cycle) while another mold is undergoing the injection molding process (e.g., having molten material injected into it), there is no loss of productivity (e.g., parts molded per hour) when compared to molding with a traditional mold carrier.

It is to be understood that the aforementioned advantages are example advantages and should not be construed as limiting. Embodiments of the present disclosure can contain all, some, or none of the aforementioned advantages while remaining within the spirit and scope of the present disclosure.

As used herein, a "stress release cycle" is the process a component undergoes whereby inner stresses are released through controlled heating and cooling of the component. For example, the stress release cycle may include a plurality of heating and cooling stages, and a component may be in the stress release cycle from the moment the injection molding nozzle is removed from the component's mold until the inner stresses are removed and the component is ready to be released from the mold. A "stress release profile" includes one or more temperatures and/or temperature rates/curves that define a target temperature of the component at a given position and/or time in the stress release cycle. For example, each heating and cooling stage in the stress release cycle may have one or more corresponding target temperatures in the stress release profile.

Turning now to the figures, FIG. 1 illustrates a schematic of an injection molding machine 100 injecting molten material 102 into a rotatable mold carrier 120, in accordance with embodiments of the present disclosure. The injection molding machine 100 includes a reciprocating screw 110 configured to heat up, mix, and inject the molten material 102 through the nozzle 106 and into a first mold 128A on the mold carrier. A barrel 108 encases the reciprocating screw 110 and molten material 102. One or more heating units or bands 104 wrap around the barrel 108 and nozzle 106 to help ensure that the molten material 102 stays melted; however, in some embodiments, the majority of the heating may be performed by the reciprocating screw 110.

The example mold carrier 120 shown in FIG. 1 includes three main components: a mold bearing chassis 122, a pressure bearing plate 124, and a tie bar 126. The mold bearing chassis 122 includes a plurality of molds 128A, 128B (collectively referred to as molds 128), each having a mold cavity 130 into which molten material 102 is injected. In some embodiments, the molds 128 are identical (i.e., to create a plurality of the same component). In other embodiments, one or more of the molds 128 may be different. While not shown, the molds 128 may include a plurality of subcomponents, as would be recognized by a person of ordinary skill in the art. For example, the molds 128 may include one or more sprues, runners, gates, and/or ejector pins. In some embodiments, each mold 128 is configured to create a single component. In other embodiments, one or more of the molds 128 include multiple mold cavities such that multiple components are created together.

In some embodiments, mold bearing chassis 122 includes one or more components undergoing an injection molding process and one or more other components undergoing a stress release cycle. In other words, by incorporating multiple, distinct molds 128 into a single mold bearing chassis 122, components can be annealed after injection molding without having to be removed from their mold without halting the injection molding process.

In order to monitor and control the stress release cycle for a component, the mold carrier 120 may include a plurality of sensors (e.g., thermal/temperature sensors, not shown) located at a plurality of positions on the mold carrier 120 (e.g., on the mold bearing chassis 122). Each position may correspond to the location of a mold 128 in the mold bearing chassis 122 and/or a location of the mold relative to the injection molding machine 100. The mold carrier 120 may further include a plurality of heating/cooling elements disposed on or near the mold carrier 120 (e.g., also at/near each position on the mold bearing chassis 122). As used herein, a heating element is any device capable of applying thermal energy to the mold bearing chassis 122, a mold 128, or a component in a mold to increase the temperature of the component. Similarly, a cooling element is any device capable of removing thermal energy from the mold bearing chassis 122, a mold 128, or a component in a mold to increase the temperature of the component. In various embodiments, the heating/cooling elements may be disposed on, in, or near (or any combination thereof using any number of heating/cooling elements) any of the mold carrier 120, the mold bearing chassis 122, the pressure bearing plate 124, the mold 128, and/or the component.

Data from the sensors may be fed into a controller (e.g., a processor), which can compare the temperature values to a stress release profile for the component. The stress release profile may be generated according to an ideal or target temperature curve for the component. The stress release profile may be based on, for example, the material the component is being made out of (e.g., the specific polymer), the structure of the component, the processing temperature, and the pressure). If the temperature received from the sensors matches the stress release profile (e.g., is within a threshold from the target temperature), the controller may continue monitoring the component.

If the temperature is outside of the acceptable range (e.g., determined according to target temperature and one or more thresholds), the controller may activate a heating or cooling element at/near the position of the component. In some embodiments, a single threshold is used to determine the acceptable range; however, in other embodiments, multiple thresholds may be used. For example, a given polymer may not have problems if allowed to cool too slowly, but if it cools too quickly it may become brittle. Accordingly, the threshold for the component being too warm (e.g., cooling too slowly) may be larger than the threshold for the component being too cool.

Each component within the mold bearing chassis 122 may be individually monitored. The components may be monitored according to the same stress release profile (e.g., when all components are identical), or according to individual stress release profiles (e.g., when one or more components use a different material, have a different structure, etc.). At a particular point in time, each component may be in a different part of the stress release cycle. Accordingly, each component in the mold bearing chassis 122 may have a different target temperature. In some embodiments, in order to ensure that the heating/cooling of one component does not affect a neighboring component, each mold 128 in the mold bearing chassis 122 may be thermally isolated from other molds 128. The molds 128 may be thermally isolated in numerous ways, including, for example, using thermal insulators embedded in the mold bearing chassis 122 between the molds 128. Other methods for thermally isolating the molds would be recognized by a person of ordinary skill in the art, and the present disclosure is not limited to any particular method.

In some embodiments, each mold 128 may be individually removable from the mold bearing chassis 122. In other words, once a component has completed the stress release cycle, its mold 128 can be removed without affecting the other molds 128 in the mold bearing chassis 122, and without separating the mold bearing chassis 122 from the pressure bearing plate 124. In some embodiments, the molds 128 themselves may not be removed from the mold bearing chassis 122; instead, the mold bearing chassis 122 and molds 128 may be configured to allow a component to be removed without affecting the rest of the components.

The pressure bearing plate 124 includes a channel 132 which the nozzle 106 enters when injecting the molten material 102 into the mold 128. The pressure bearing plate 124 may be flush with (e.g., physically coupled to) the mold bearing chassis 122 during operation. The pressure bearing plate 124 may be held against the mold bearing chassis 122 in any number of ways (e.g., using mechanical fasteners, springs, a force applied to one or both of the pressure bearing plate and the mold bearing chassis, etc.). The pressure bearing plate 124 may ensure that high pressures are maintained in the molds 128 during the stress release cycle. Additionally, the pressure bearing plate 124 may prevent components from expanding out of their molds 128 during the thermal cycling that occurs during the stress release cycle. By constraining the components in their molds 128, the pressure bearing plate 124 helps ensure that a component goes through the entire stress release cycle (e.g., the entire annealing process) without warping.

The tie bar 126 runs through the center of both the mold bearing chassis 122 and the pressure bearing plate 124. The tie bar may help hold the mold bearing chassis 122 and the pressure bearing plate 124 together and in position for the injection molding machine 100. Additionally, the tie bar 126 may enable the mold bearing chassis 122 to rotate (e.g., using motors or other mechanisms, not shown) relative to the pressure bearing plate 124. Accordingly, after molten material 102 is injected into a first mold 128A, the mold bearing chassis 122 can rotate such that second mold 128B is aligned with the nozzle 106, and molten material 102 can be injected into the second mold 128B. In some embodiments, the tie bar 126 may hold the mold bearing chassis 122 stationary while the pressure bearing plate 124 rotates.

In an example embodiment, the injection molding machine 100 injects molten material into the first mold 128A at a first time. The first mold 128A is at a first position (e.g., a position aligned with the nozzle 106 of the injection molding machine 100). The material in the first mold (e.g., the component) is allowed to cool for a period of time so that it partially solidifies. Once the component is sufficiently solidified that removal of the nozzle 106 would not cause material to extrude out of the first mold 128A, the nozzle 106 is removed and the mold bearing chassis 122 is rotated.

Rotation of the mold bearing chassis 122 causes the first mold 128A to move into a second position and a second mold 128B to move into the first position. As described above, the injection molding machine 100 may then inject molten material into the second mold 128B. Meanwhile, the component in the first mold 128A then begins going through a stress release cycle in order to remove inner stresses from the component. The component undergoes the stress release cycle from the time when the injection molding is completed (e.g., once the molten material is injected into the first mold 128A) until the first mold 128A reaches the last position. The stress release cycle is controlled using a controller, one or more heating/cooling elements, and temperature sensors.

Throughout the stress release cycle, the component may rotate through a plurality of positions as material is being injected into other molds 128 on the mold carrier 120. For example, if the mold carrier 120 includes eight different molds, one mold (e.g., at the first position) may be having material injected into it, while the components in the remaining seven molds (e.g., at the second through eighth positions) are undergoing the stress release cycle. Each component in the stress release cycle may be at a different stage of the stress release cycle. For example, the component in the second position may be heating up, while the components in the third through eighth positions may be cooling down at one or more cooling rates. Each component may rotate through all eight positions. Once at the final position, the component may be removed from its mold, and the now-empty mold may rotate into the first position, where it is again filled with molten material.

Figure 2:
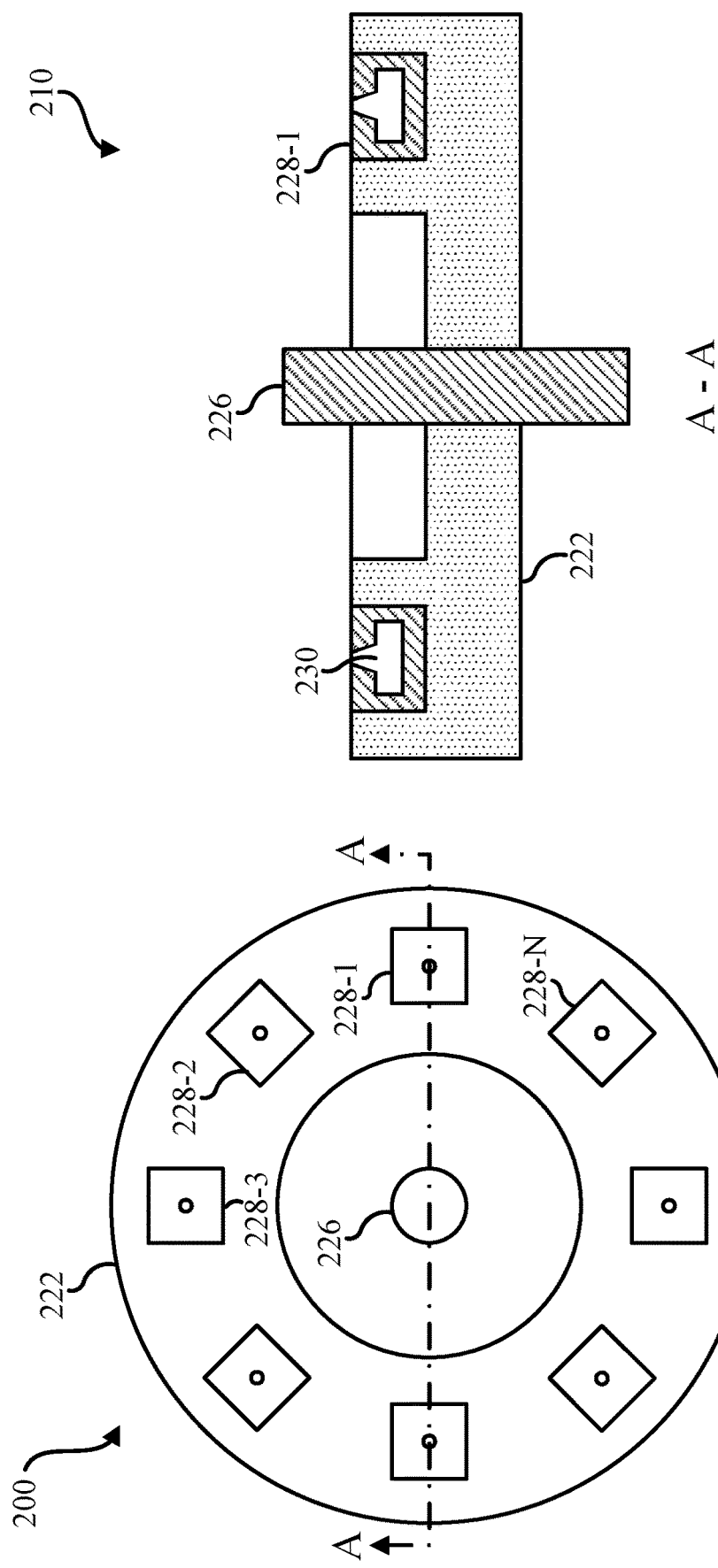
FIG. 2 illustrates two views of a rotatable mold bearing chassis, in accordance with embodiments of the present disclosure.

Referring now to FIG. 2, illustrated are two views of a rotatable mold bearing chassis 222, in accordance with embodiments of the present disclosure. A first view 200 shows a surface of the mold bearing chassis 222 that abuts the pressure bearing plate during operation. The second view 210 is a sectional view of the mold bearing chassis 222 seen along cut line A-A. In some embodiments, the mold bearing chassis 222 is the same as, or substantially similar to, the mold bearing chassis 122 illustrated and described with respect to FIG. 1. The mold bearing chassis 222 includes a plurality of molds 228-1, 228-2, 228-3, and 228-N (collectively referred to as molds 228), each having a mold cavity 230, and a tie bar 226. The molds 228 and tie bar 226 may be the same as, or substantially similar to, the molds 128 and tie bar 126 illustrated and described with respect to FIG. 1.

In the embodiment illustrated in FIG. 2, the mold bearing chassis 222 includes eight molds 228. However, any number of molds 228 may be included in the mold bearing chassis 222. Each mold 228 is associated with a different position. For example, the first mold 228-1 is at the first position, the second mold 228-2 is at the second position, and so on. As described herein, the temperature at each position may be controlled by a controller using one or more heating/cooling elements. The temperature may be controlled according to a stress release profile for the components.

Figure 3:
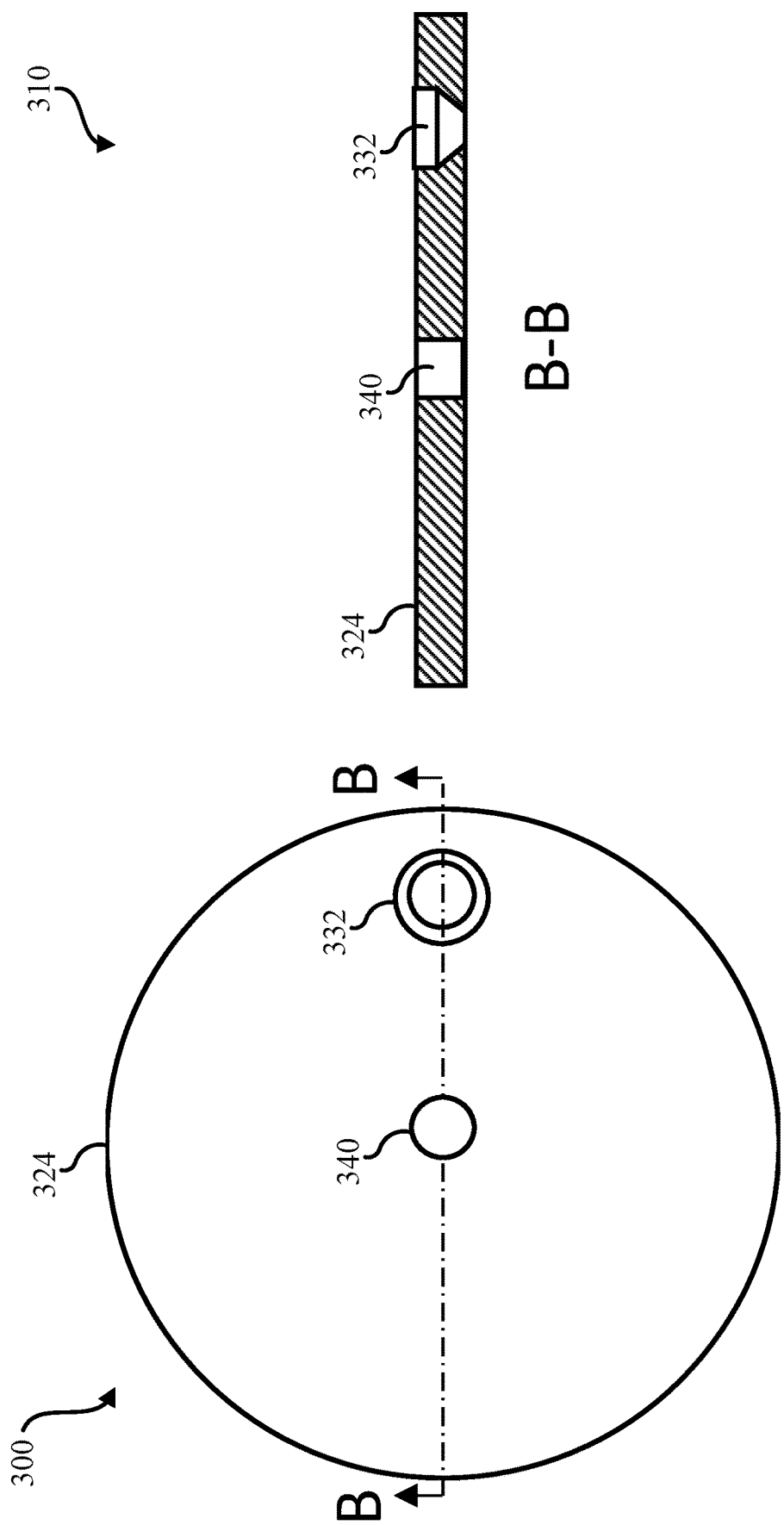
FIG. 3 illustrates two views of a pressure bearing plate, in accordance with embodiments of the present disclosure.

Referring now to FIG. 3, illustrated are two views of a pressure bearing plate 324, in accordance with embodiments of the present disclosure. A first view 300 shows a surface of the pressure bearing plate 324 that faces an injection molding machine during operation. The second view 310 is a sectional view of the pressure bearing plate 324 seen along cut line B-B. In some embodiments, the pressure bearing plate 324 is the same as, or substantially similar to, the pressure bearing plate 124 illustrated and described with respect to FIG. 1. The pressure bearing plate 324 includes an opening 340 configured to receive a tie bar (e.g., tie bar 126 from FIG. 1). The pressure bearing plate 324 further includes a channel or receptacle 332. Similar to the channel 132 described in reference to FIG. 1, the channel 332 is dimensioned such that a nozzle (e.g., nozzle 106 in FIG. 1) is able to enter the channel 332 to inject material into a mold cavity on the mold bearing chassis.

Figure 4:
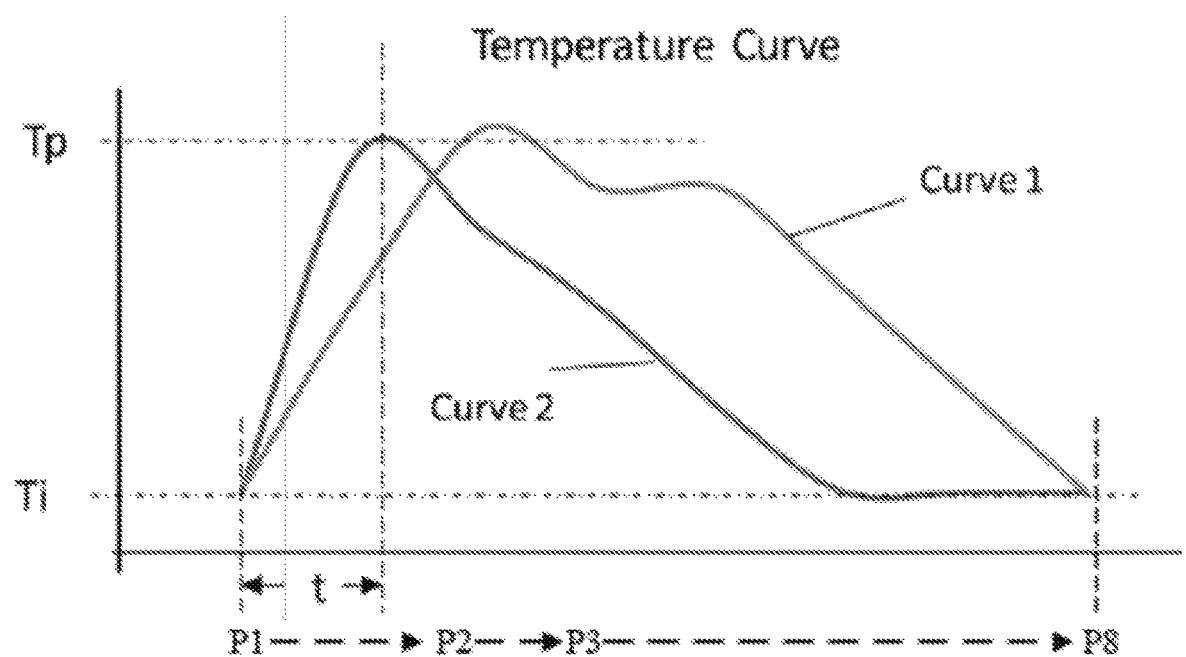
FIG. 4 illustrates temperature curves for annealing an injection molded component still in the mold carrier using two different stress release cycles, in accordance with embodiments of the present disclosure.

Referring now to FIG. 4, illustrated are temperature curves for annealing an injection molded component still in the mold carrier using two different stress release cycles, in accordance with embodiments of the present disclosure. Each of the stress release cycles, exemplified by curve 1 and curve 2, respectively, may correspond to a different molded component. For example, different structures and or materials may require different stress release cycles in order to remove residual inner stresses within the manufactured components without causing warpage or damage to the components. Accordingly, different stress release profiles (corresponding to the different stress release cycles) may be used for different components.

For example, during injection molding, the mold stops at a first position (P1). The mold temperature at P1 is set to be a temperature Ti. Temperature Ti is selected to allow the component the quickly solidify. While the component may not fully solidify at Ti, or may not stay at Ti long enough to fully solidify, this temperature Ti would at least allow the component to solidify sufficiently such that no material is extruded back out the mold when the nozzle is removed, despite the high pressure in the mold during injection.

After solidification at P1, the mold carrier rotates such that the mold is at the second position P2, and the component enters a stress release cycle. The stress release cycle is configured to control the temperature of the component according to a stress release profile in order to release inner stresses in the molded component. The stress release cycle may begin some amount of time t (t≥0 s) after leaving the first P1. In some embodiments, the stress release cycle includes raising the temperature of the component to the peak temperature Tp, which may be selected according to characteristics of the component (e.g., material, structure) and then fall back to Ti when the part is released out of the mold.

The temperature may change based on the stress release profile from the time that the component enters the second position P2 until the component reaches the last position (P8). The temperature at each position may be monitored and controlled by a controller and one or more heating/cooling elements to ensure that the component being manufactured follows (e.g., stays with an acceptable threshold of) the associated stress release profile (e.g., curve in FIG. 4). At P8, the mold opens, and the part is removed. Then, the mold goes back to P1 and starts the next cycle. This whole process occurs for all molds on the mold chassis simultaneously. In other words, when a first mold is a P1, other molds with other components are at P2, P3, etc.

The characteristics of the stress release profile can be based on various characteristics of the component being manufactured. For example, the temperature (Ti and Tp), the amount of time spent at each temperature/position (t), and the cooling rate(s) may all depend on product characteristics (e.g., shape, size, material, etc.). Furthermore, how the part is release from the mold at P8 can depend on the product characteristics.

For example, an LGA socket made from a liquid-crystal polymer (LCP) may go through a surface-mount technology (SMT) process (e.g., reflow). In this process, the temperature may reach 260° C., and the LCP in the injection molding machine may reach 320-370° C. Thus, the Ti could be between room temperature and 150° C., and the Tp could be 230-280° C. In this example, the cooling rate could be consistent for the whole process, or it may be different at different temperature zones (e.g., at different positions).

Figure 5:
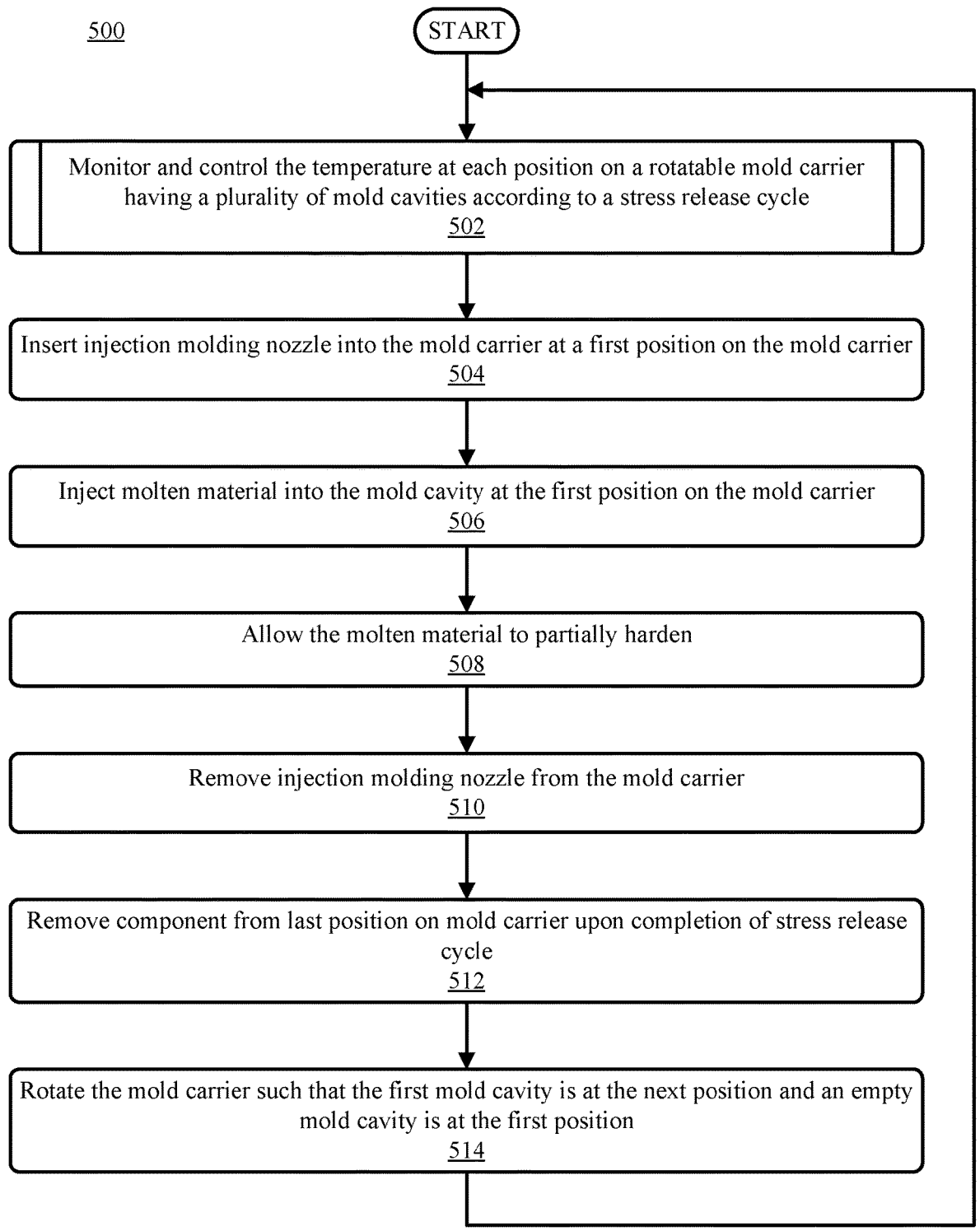
FIG. 5 illustrates a flowchart of an example method for manufacturing a plurality of components using an injection molding process and a rotatable mold carrier, in accordance with embodiments of the present disclosure.

Referring now to FIG. 5, illustrated is a flowchart of an example method 500 for manufacturing a plurality of components using an injection molding technique and a rotatable mold carrier, in accordance with embodiments of the present disclosure. The method 500 may be performed by hardware, firmware, software executing on a processor, or any combination thereof. The method 500 may begin at operation 502, where a processor may monitor and control the temperature at each position on a mold carrier according to a stress release cycle. Operation 502 is described in more detail reference to FIG. 6. Furthermore, while illustrated as the first operation in the method 500, operation 502 may be an ongoing operation that occurs throughout execution of the method 500.

At operation 504, an injection molding nozzle is inserted into the mold carrier at a first position. As described herein, the first position may be the position an empty mold enters after having the previous component removed. After the injection molding nozzle is inserted into the mold carrier, molten material may be injected into the mold cavity of the empty mold at operation 506 and the molten material may be allowed to partially harden/solidify at operation 508. The molten material may only partially solidify at operation 508. Specifically, the molten material may solidify enough that material will not extrude out of the mold when the injection molding nozzle is removed. Once the molten material has sufficiently solidified such that it will not extrude out of the mold, the injection molding nozzle is removed from the mold carrier (or, at least from the mold bearing chassis) at operation 510.

At operation 512, the component in the mold at the last position is removed. This is done at the completion of the stress release cycle (e.g., once inner stresses in the component are gone or substantially gone). The mold carrier is then rotated at operation 514 such that the empty mold (e.g., the one where the component was removed at operation 512) is in the first position and the method 500 is repeated.

Figure 6:
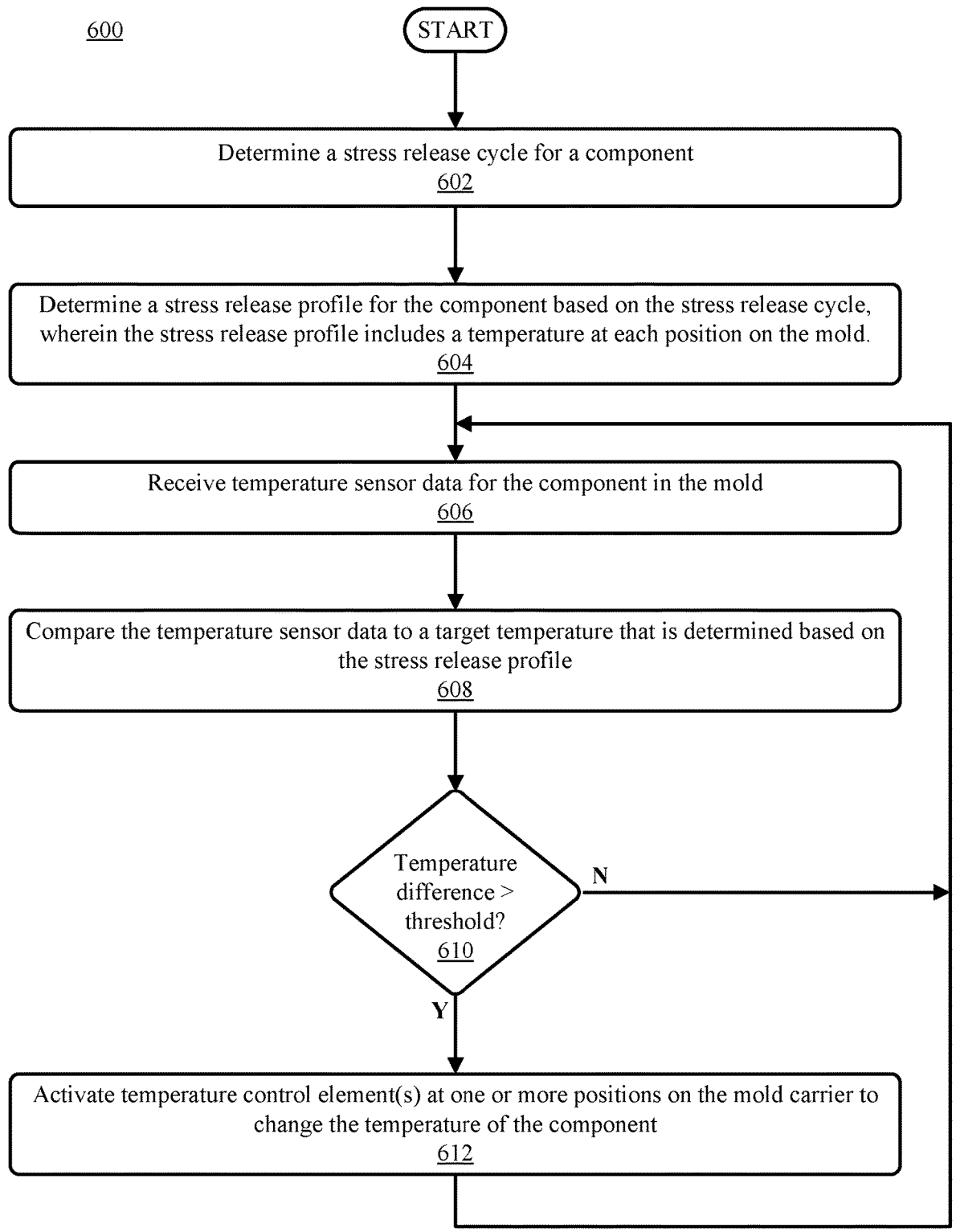
FIG. 6 illustrates a flowchart of an example method for monitoring and controlling inner stresses of one or more components being manufactured using an injection molding process while the components are still in the mold, in accordance with embodiments of the present disclosure.

Referring now to FIG. 6, illustrated is a flowchart of an example method 600 for monitoring and controlling inner stresses of one or more components being manufactured using an injection molding process while the components are still in the mold, in accordance with embodiments of the present disclosure. The method 600 may be performed by hardware, firmware, software executing on a processor, or any combination thereof. The method 600 may begin at operation 602, determine a stress release cycle for a component.

As described herein, the stress release cycle may be a time-variant temperature curve for the component. The stress release cycle may be based on, for example, the material used in the injection molding process and the structure of the component (e.g., the size, shape, and other physical/geometric properties). The stress release cycle may be automatically determined by a processor based on the characteristics of the component, set by a user (e.g., manually or through selection of one of a plurality of predetermined cycles), based on historical stress release cycles (e.g., with consideration of problems that arose during manufacturing), or through a combination thereof.

At operation 604, a stress release profile for the component is determined (e.g., generated) based on the stress release cycle. The stress release profile includes a temperature (and, optionally, a pressure) at one or more positions. The positions may correspond to locations where the component will be at a given time. For example, the component may move in a sequence from a first position (where molten material is injected into an empty mold) to a last position (e.g., where the component is ready to be removed from the mold), as described herein. Using the stress release profile, an initial temperature may be set for each position. Using the stress release profile, initial temperatures at each location on mold carrier may be set using heating/cooling elements disposed on or near the mold carrier.

In some embodiments, the stress release profile includes more than one temperature for a position. For example, based on the stress release cycle (e.g., desired temperature curve, as illustrated in FIG. 4) and the amount of time that the component stays at each position (e.g., based on how long it takes for other components to be ready to move to the next position), the component may need to have a large change in temperature at a given position. Accordingly, the stress release cycle may include a plurality of target temperatures (e.g., at different times) and/or a heating/cooling rate for one or more of the positions.

At operation 606, temperature data for the component may be received. The temperature data may be received from one or more sensors (e.g., a thermocouple) on or near the mold carrier (e.g., on, near, or in the mold bearing chassis, the pressure plate, a mold, etc.). The temperature data is compared to a target temperature determined using the stress release profile at operation 608. For example, a processor may determine that the temperature of the component when it first gets to the third position should be 180° C. (target temperature) using the stress release profile, and the processor may compare this target temperature to data received from a temperature sensor (the actual temperature).

At decision block 610, the different between the actual temperature of the component and the target temperature of the component are compared to one or more thresholds. If the temperature difference does not exceed the one or more thresholds, the method 600 returns to operation 606, and monitoring of the temperature of the component continues. However, if the temperature difference does exceed the one or more thresholds at decision block 610, temperature control element(s) are activated to change the actual temperature of the component at operation 612. For example, if the actual temperature of the component is too high, a cooling element is activated to reduce the temperature of the component. After activation of the heating/cooling element at operation 612, the method 600 returns to operation 606, and monitoring of the temperature of the component continues.

In some embodiments, instead of (or in addition to) activating a cooling or heating element, the method 600 may include changing an amount of time that the component stays in the stress release cycle (e.g., the amount of time spent at its current position or at a future position). For example, if the temperature of the component is too high, the amount of time the component spends at its current position may be increased to allow the cooling to continue for a longer period of time before the component enters the next phase of the stress release cycle, which may be a heating phase.

It is to be understood that while FIG. 6 describes the method 600 for monitoring and controlling temperature for a single component, the method 600 may be applied to each component in a mold carrier. The method 600 may include monitoring some or all components in the mold carrier according to the same, or different, stress release cycles. For example, a stress release profile may be generated for each component, and a processor can control temperature at each location on the mold carrier in accordance with the stress release profile associated with the component at that location.

Figure 7:
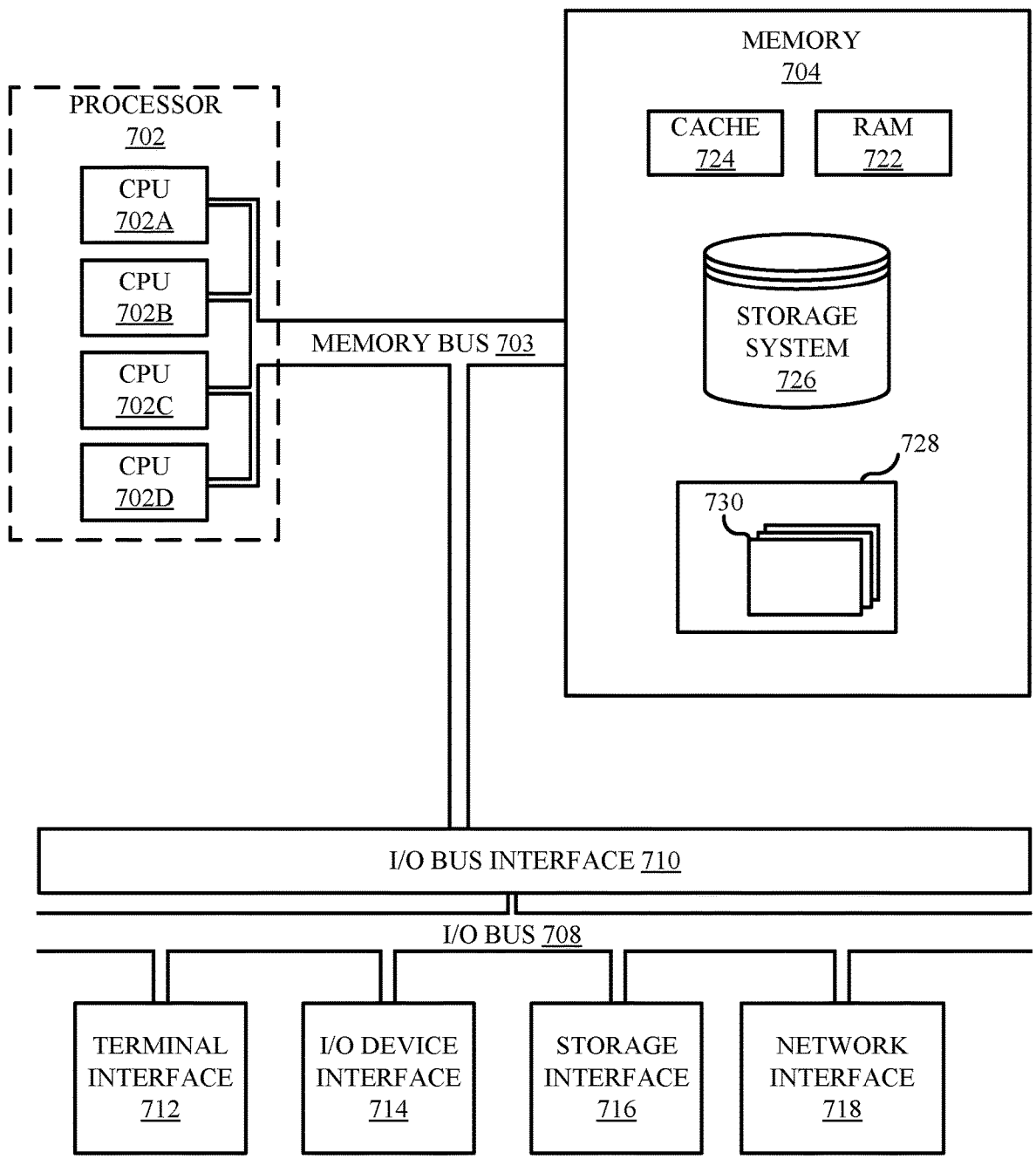
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   injecting molten material into a first mold disposed on a mold carrier that includes a plurality of molds using an injection molding machine to create a component;
   allowing the component in the first mold to at least partially solidify;
   rotating, after the component has partially solidified, the mold carrier such that a second mold of the plurality of molds is aligned with a nozzle of the injection molding machine;
   determining, automatically by a processor, a stress release profile for the component based on at least one characteristic of the component,
   wherein the stress release profile includes a plurality of stages used to release inner stresses within the component during in-mold solidification of the component through controlled heating and cooling of the component, each stage including a target temperature for the component and an amount of time that the component is to be held at the target temperature, wherein the stress release profile includes at least one active heating stage and at least one active cooling stage; and controlling a temperature of the first mold according to the stress release profile, wherein controlling the temperature of the first mold according to the stress release profile comprises:
monitoring, using at least one temperature sensor, an actual temperature of the component;
comparing the actual temperature of the component to a corresponding target temperature of the component based on the stress release profile to detect a deviation from the stress release profile; and
modifying, in response to detecting the deviation from the stress release profile, the stress release profile to correct for the detected deviation.

2. The method of claim 1, wherein controlling the temperature of the first mold according to the stress release profile further includes:
determining, based on the comparing, a temperature difference between the actual temperature of the component and the corresponding target temperature of the component; and
responsive to the temperature difference exceeding a threshold, activating a temperature control element to change a temperature of the component.

3. The method of claim 2, wherein each of the target temperatures corresponds to a position of the component relative to the nozzle of the injection molding machine.

4. The method of claim 3, wherein the target temperatures are further based on an amount of time that the component has been at the position.

5. The method of claim 1, wherein the at least one characteristic is selected from the group consisting of a shape of the component, a size of the component, and a material of the component.

6. The method of claim 1, wherein the stress release profile is automatically determined by a processor based on a shape of the component, a size of the component, a material of the component, and a pressure within the first mold.

7. The method of claim 1, wherein the at least one temperature sensor comprises a plurality of temperature sensors disposed on the mold carrier, wherein the plurality of temperature sensors are arranged such that each mold of the plurality of molds is monitored by one or more temperature sensors.

8. The method of claim 1, wherein controlling the temperature of the first mold according to the stress release profile further comprises:
determining, based on the comparing, a temperature difference between the actual temperature of the component and the corresponding target temperature of the component; and
in response to the actual temperature of the component being below the corresponding target temperature of the component, activating a heating element to raise the actual temperature of the component.

9. The method of claim 1, wherein controlling the temperature of the first mold according to the stress release profile further comprises:
determining, based on the comparing, a temperature difference between the actual temperature of the component and the corresponding target temperature of the component; and
in response to the actual temperature of the component being above the corresponding target temperature of the component, activating a cooling element to lower the actual temperature of the component.

10. The method of claim 1, wherein modifying the stress release profile comprises:
extending, in response to determining that the actual temperature of the component at a first stage deviates from the corresponding target temperature for the first stage by more than a threshold amount, the amount of time that the component is in the first stage.

11. The method of claim 1, wherein modifying the stress release profile comprises:
extending, in response to determining that the actual temperature of the component at a first stage deviates from the corresponding target temperature for the first stage by more than a threshold amount, the amount of time that the component is in a second stage, the second stage being after the first stage.

12. The method of claim 1, wherein modifying the stress release profile comprises:
reducing, in response to determining that the actual temperature of the component at a first stage deviates from the corresponding target temperature for the first stage by more than a threshold amount, the amount of time that the component is in the first stage.

13. The method of claim 1, wherein one or more stages of the stress release profile further include a target pressure.

14. A computer program product comprising a computer readable storage medium having program instructions embodied therewith, the program instructions executable by processor to cause the processor to perform a method comprising:
injecting molten material into a first mold disposed on a mold carrier that includes a plurality of molds using an injection molding machine to create a component;
allowing the component in the first mold to at least partially solidify;
rotating, after the component has partially solidified, the mold carrier such that a second mold of the plurality of molds is aligned with a nozzle of the injection molding machine;
determining, automatically by a processor, a stress release profile for the component based on at least one characteristic of the component,
wherein the stress release profile includes a plurality of stages used to release inner stresses within the component during in-mold solidification of the component through controlled heating and cooling of the component, each stage including a target temperature for the component and an amount of time that the component is to be held at the target temperature,
wherein the stress release profile includes at least one active heating stage and at least one active cooling stage; and
controlling a temperature of the first mold according to the stress release profile,
wherein controlling the temperature of the first mold according to the stress release profile comprises:
monitoring, using at least one temperature sensor, an actual temperature of the component;
comparing the actual temperature of the component to a corresponding target temperature of the component based on the stress release profile to detect a deviation from the stress release profile; and
modifying, in response to detecting the deviation from the stress release profile, the stress release profile to correct for the detected deviation.

15. The computer program product of claim 14, wherein controlling the temperature of the first mold according to the stress release profile further includes:
- determining, based on the comparing, a temperature difference between the actual temperature of the component and the corresponding target temperature of the component; and
- responsive to the temperature difference exceeding a threshold, activating a temperature control element to change a temperature of the component.

16. The computer program product of claim 15, wherein each of the target temperatures corresponds to a position of the component relative to the nozzle of the injection molding machine.

17. The computer program product of claim 16, wherein the target temperatures are further based on an amount of time that the component has been at the position.

18. The computer program product of claim 14, wherein the at least one characteristic is selected from the group consisting of a shape of the component, a size of the component, and a material of the component.

19. The computer program product of claim 14, wherein the stress release profile is automatically determined by a processor based on a shape of the component, a size of the component, and a material of the component.

20. A system comprising:
- a memory; and
- a processor communicatively coupled to the memory, wherein the processor is configured to perform a method comprising:
  - injecting molten material into a first mold disposed on a mold carrier that includes a plurality of molds using an injection molding machine to create a component;
  - allowing the component in the first mold to at least partially solidify;
  - rotating, after the component has partially solidified, the mold carrier such that a second mold of the plurality of molds is aligned with a nozzle of the injection molding machine;
  - determining, automatically by a processor, a stress release profile for the component based on at least one characteristic of the component,
  - wherein the stress release profile includes a plurality of stages used to release inner stresses within the component during in-mold solidification of the component through controlled heating and cooling of the component, each stage including a target temperature for the component and an amount of time that the component is to be held at the target temperature,
  - wherein the stress release profile includes at least one active heating stage and at least one active cooling stage; and
  - controlling a temperature of the first mold according to the stress release profile,
  - wherein controlling the temperature of the first mold according to the stress release profile comprises:
    - monitoring, using at least one temperature sensor, an actual temperature of the component;
    - comparing the actual temperature of the component to a corresponding target temperature of the component based on the stress release profile to detect a deviation from the stress release profile; and
    - modifying, in response to detecting the deviation from the stress release profile, the stress release profile to correct for the detected deviation.

* * * * *